(12) United States Patent
Blanco et al.

(10) Patent No.: US 8,893,664 B2
(45) Date of Patent: Nov. 25, 2014

(54) DEVICE FOR PICKING UP ANIMAL EXCREMENT

(76) Inventors: Roberto Horacio Blanco, Don Torcuato (AR); Alejandro Jose Klarenberg, Don Torcuato (AR); Carlos Conrado Bosio Blanco, Barcelona (ES)

( * ) Notice: Subject to any disclaimer, the term of this patent is extended or adjusted under 35 U.S.C. 154(b) by 403 days.

(21) Appl. No.: 13/320,188

(22) PCT Filed: May 11, 2010

(86) PCT No.: PCT/ES2010/070314
§ 371 (c)(1),
(2), (4) Date: Jan. 24, 2012

(87) PCT Pub. No.: WO2010/130860
PCT Pub. Date: Nov. 18, 2010

(65) Prior Publication Data
US 2012/0247402 A1    Oct. 4, 2012

(30) Foreign Application Priority Data

May 12, 2009 (AR) ................................ P090101697

(51) Int. Cl.
*A01K 23/00*    (2006.01)
(52) U.S. Cl.
CPC ..................................... *A01K 23/00* (2013.01)
USPC .......................................... 119/868; 119/867
(58) Field of Classification Search
USPC ......................................... 119/867–869, 161
See application file for complete search history.

(56) References Cited

U.S. PATENT DOCUMENTS

| 4,813,949 | A | 3/1989 | O'Rourke | |
| 5,427,059 | A | 6/1995 | Logan | |
| 5,819,691 | A | 10/1998 | Lavi et al. | |
| 6,116,194 | A * | 9/2000 | Komarnitskiy | 119/867 |
| 7,574,980 | B2 * | 8/2009 | Bosio Blanco et al. | 119/868 |
| 2014/0007820 | A1 * | 1/2014 | Lenz | 119/869 |

FOREIGN PATENT DOCUMENTS

| DE | 19827997 | 12/1999 |
| EP | 1665928 | 9/2008 |
| WO | 0143537 | 6/2001 |

* cited by examiner

*Primary Examiner* — Kristen C Hayes
(74) *Attorney, Agent, or Firm* — Blaine T. Bettinger; George R. McGuire; Bond Schoeneck & King, PLLC

(57) ABSTRACT

An animal excrement collection device comprising a collection bag with a front panel defining a first opening, a sheath formed in the front panel and located proximate to the perimeter of the first opening, first and second lock pins removeably attached to the excrement collection bag, a filament located within the sheath and comprising a first end connected to the first lock pin and a second end connected to the second lock pin, a first string with a first end removeably connected to the first lock pin and a second end in communication with the front panel, a second string with a first end removeably connected to the second lock pin and a second end in communication with the front panel, wherein a user closes the opening and disengages the from the animal by pulling on the first and second lock pins.

16 Claims, 3 Drawing Sheets

DEVICE FOR PICKING UP ANIMAL EXCREMENT

CROSS-REFERENCE TO RELATED APPLICATIONS

The present application is the United States national stage filing under 35 U.S.C. 371 of PCT/ES2010/070314 filed on May 11, 2010, entitled "Device for Picking up Dog Excrement," which claims priority to Argentine Patent P09 01 01697, filed on May 12, 2009. The content of both is hereby relied upon and incorporated herein by reference in their entirety.

BACKGROUND OF THE INVENTION

1. Field of the Invention

The present invention relates to articles designed to maintain a clean environment and, more specifically, to an animal excrement collector whose main purpose is to collect animal excrement at the moment it is produced, thereby preventing dirt and pollution.

2. Description of the Related Art

There are known in the art some animal waste collectors designed to prevent pollution of places which owners or dog walkers take their animals to attend their physiological needs, including both urination and defecation. These collectors include brushes, bags to pick up and properly dispose of stools, and fixable harnesses which are located on the dog's body and which have a bag where excrement is stored to avoid polluting public places such as sidewalks, flowerbeds, and squares.

For example, U.S. Pat. No. 4,813,949 describes "dogs' or other small quadruped animals' diaper." This diaper is formed by a T-shaped textile band used for body and tail. It includes a bifurcation projected from said band's center with hook-and-loop fasteners on one or both sides and an absorbent pillow fixed at the center of the tail-band. It is fastened by embracing the animal's body and crossing both bands to each side of the tail. This device evidences partial and poor protection.

Patent number DE19827997 describes another type of "disposable diaper for all dog sizes." It is very similar to baby diapers as it is fastened by adhesive tapes.

Patent number WO2001/43537 A1 refers to a "simple animal feces receiver, applicable to dogs." It is composed of an annular inner band under which a feces-receiver bag is applied and which is in turn, fastened by another annular band fastened to the first band. It is fastened against the anus and kept in position by a pair of laces fastened by lateral straps extended along the internal face of the animal's back legs and going up the animal's hip where they are joined on the upper part of the body by another pair of straps tied to the inner annular band extended to each side of the tail. In order to remove the bag, the unit to be disposed is dismounted and removed between the two bands and the close it manually.

U.S. Pat. No. 5,819,691 comprises an "Apparatus to collect animal feces." It is formed by a harness comprising an adjustable type of belt which is collocated on animal's body with stripes projected to the back ending on an annular body which carries a collecting bag collocated right next to dog's body.

U.S. Pat. No. 5,427,059 is a "device to collect dog's or similar animal's waste." It is composed by a harness designed to be adjusted to dog's body according to its size. It extends from dog's neck and by means of lateral stripes fastened along the body; a bag put against the anus is supported in a position that does not bother the animal.

All the above-mentioned inventions are fairly complicated in their method of location or attachment to the animal's body. In addition they are expensive and non-practical due to their awkward handling. Some of these inventions also have the major disadvantage of forcing the owner to manually remove the collecting bag, thereby running the risk of getting dirty and having to endure unpleasant smells; besides, placement and removal often requires several manipulations which can be time-consuming and awkward and which can turn a pleasant walk with the dog into a complex and annoying job.

In addition, Patent Application No. P03 01 03172 (EP1665928) can also be mentioned. It describes a particular invention which tends to resolve the problem. It consists of a device that is composed a disposable bag for animal waste collection which is adhered to a annular cardioid semi-rigid element to which elastics are hooked by means of removable devices designed to fasten the invention to dog's collar, harness or body. This invention has several aspects that could be improved, including: (a) the elastics, once the movable devices are activated, remained hooked to the collar or harness; (b) the use of the cardioid semi-rigid element adhered to the collecting bag so as to enable the functioning of the different removable fixable means due to the fact that what activates the trigger which detaches the elastics is the bag's closing filament which is attached to fixed points provided by the cardioid element; (c) a tuck is used on the bag generated on the perimeter of the opening which causes a complication at the time of threading the closing filament and at the time of sticking the bag to be commercialized; and (d) the fact that the closing filament is what enables detachment of mobile means, forces the person operating the device to make an additional movement. Improvement of all the above mentioned problems will facilitate the device's placement and removal and will improve significantly production costs.

BRIEF SUMMARY OF THE INVENTION

It is therefore a principal object and advantage of the present invention to provide a low-cost impermeable bag, preferably of thermoplastic material, which is placed beforehand, facing the animal's anus by disposing filaments enabling disposition and with which the correct position is achieved.

It is another object and advantage of the present invention to provide a bag that can be quickly removed and air-tight sealed without the need of taking any precaution to prevent the owner from getting dirty or bothering the animal.

It is yet another object and advantage of the present invention to provide a system that keeps excrement isolated in order to be disposed of without polluting the environment or causing any unpleasant smell.

Another object and advantage of the present invention is to provide a system of placing and removing the excrement's collector device and the disposal bag's simultaneous removal and closing without making the animal uncomfortable.

Accordingly, an object and advantage of the present invention is to provide an excrement collection system that: (i) is low-cost; (ii) is disposable; (iii) does not bother the animal; (iv) is easy to place on the animal; (v) comprises simultaneous bag sealing and closing and removal in just one step; (vi) prevents unpleasant smells; and (vii) prevents environmental pollution and keeps the owner's hands clean.

Other objects and advantages of the present invention will in part be obvious, and in part appear hereinafter.

In accordance with the foregoing objects and advantages, the present invention provides a low-cost impermeable bag, preferably of thermoplastic material, which is placed facing animal's anal area by simply disposing some filaments enabling disposition and with which the correct position is achieved. In this way, the bag can be quickly removed and sealed simultaneously without the need to take any precaution to prevent the owner from getting dirty or bothering the animal.

According to a second aspect of the invention is provided an animal excrement collection device comprising: (i) an excrement collection bag comprising a front panel, the front panel defining a first opening; (ii) a sheath formed on the front panel and located proximate to a perimeter of the first opening; (iii) a first lock pin removeably attached to the excrement collection bag; (iv) a second lock pin removeably attached to the excrement collection bag; (v) a filament disposed within the sheath, the filament comprising a first end connected to the first lock pin and a second end connected to the second lock pin; (vi) a first string comprising a first end removeably connected to the first lock pin and a second end in communication with the front panel; and (vii) a second string comprising a first end removeably connected to the second lock pin and a second end in communication with the front panel; (viii) wherein a user substantially closes the opening and disengages the excrement collection device from the animal by pulling the first and second lock pins in a direction away from the excrement collection bag. In a preferred embodiment, the excrement collection bag comprises an opaque and/or non-permeable material. The bag can further comprise an arch defined in an upper region of the bag, the arch creating a space for a tail of the animal when the excrement collection device is attached to the animal.

According to a third aspect of the invention is provided an animal excrement collection device comprising: (i) an excrement collection bag comprising a front panel, the front panel defining a first opening; (ii) a sheath formed on the front panel and located proximate to a perimeter of the first opening; (iii) a first lock pin removeably attached to the excrement collection bag; (iv) a second lock pin removeably attached to the excrement collection bag; (v) a filament disposed within the sheath, the filament comprising a first end connected to the first lock pin and a second end connected to the second lock pin; (vi) a first string comprising a first end removeably connected to the first lock pin and a second end in communication with the front panel; (vii) a second string comprising a first end removeably connected to the second lock pin and a second end in communication with the front panel; (viii) a layer of material attached to the front panel and located around the perimeter of the first opening; (ix) a second opening defined in the layer of material, wherein the first opening and the second opening substantially align when the layer of material is attached to the front panel, wherein the layer of material defines the sheath when the layer of material is attached to the front panel; (x) wherein a user substantially closes the openings and disengages the excrement collection device from the animal by pulling the first and second lock pins in a direction away from the excrement collection bag. The first and second openings preferably align with the anus of the animal when the excrement collection device is affixed to the animal.

According to a fourth aspect of the invention the animal excrement collection device further comprises an attachment component in communication with the front panel, wherein the second end of the first string and the second end of the second string are attached to the attachment component. The attachment component can comprise a rigid material, including but not limited to cardboard. The attachment component can further comprise a first notch engaging the second end of the first string, and a second notch engaging the second end of the second string.

According to a fifth aspect, the sheath of the animal excrement collection device further comprises a first opening and a second opening, wherein at least a portion of the first lock pin is removeably inserted into the first sheath opening and at least a portion of the second lock pin is removeably inserted into the second sheath opening.

According to a sixth aspect, the first end of the first string and the first end of the second string disengage from the first and second lock pin, respectively, when the first and second lock pins are pulled in a direction away from the excrement collection bag. The user will pull the first and second lock pins in a direction away from the excrement collection bag when excrement is deposited by the animal in the bag.

According to a seventh aspect of the invention the second end of the first string and the second end of the second string are attached to the attachment component by a first means, the first means selected from the group consisting of an anchor hook, adhesive, hook-and-loop, and a combination thereof. Further, the first and second strings each engage a portion of the animal to affix the excrement collection device to the animal. In yet another embodiment, the front panel of the bag defines a first and second hole in an upper region of the bag, where the first string passes through the first hole and the second string passes through the second hole.

According to an eighth aspect of the invention, the bag further comprises a first side panel and a second side panel. The first side panel is folded inward toward the interior of the bag and the second side panel is folded inward toward the interior of the bag prior to excrement being deposited into the bag.

From the collector's simple structure, it results that besides being disposable, compact, small, and affordable, it enables the storage or excrement at the very instant it is produced. Further, there is the added advantage of keeping excrement perfectly isolated in order to be disposed of without polluting the environment or causing any unpleasant smell.

Another worthwhile mentioning advantage is that placing and removing the excrement's collector device and disposable bag's simultaneous removal and closing (secure and almost instantly made) shall not make the animal uncomfortable.

In order to make easier to understand and to put it into use the collection device, which preferably comprises a low-cost disposable device, a precise description will be developed in the following paragraphs providing details of a preferred form of production. Illustrative figures, which will be set as examples and shall not limit the invention in any way, will be shown. Its components might be selected among many equivalents without deviating from invention's principles established in this document.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

Figure 1:
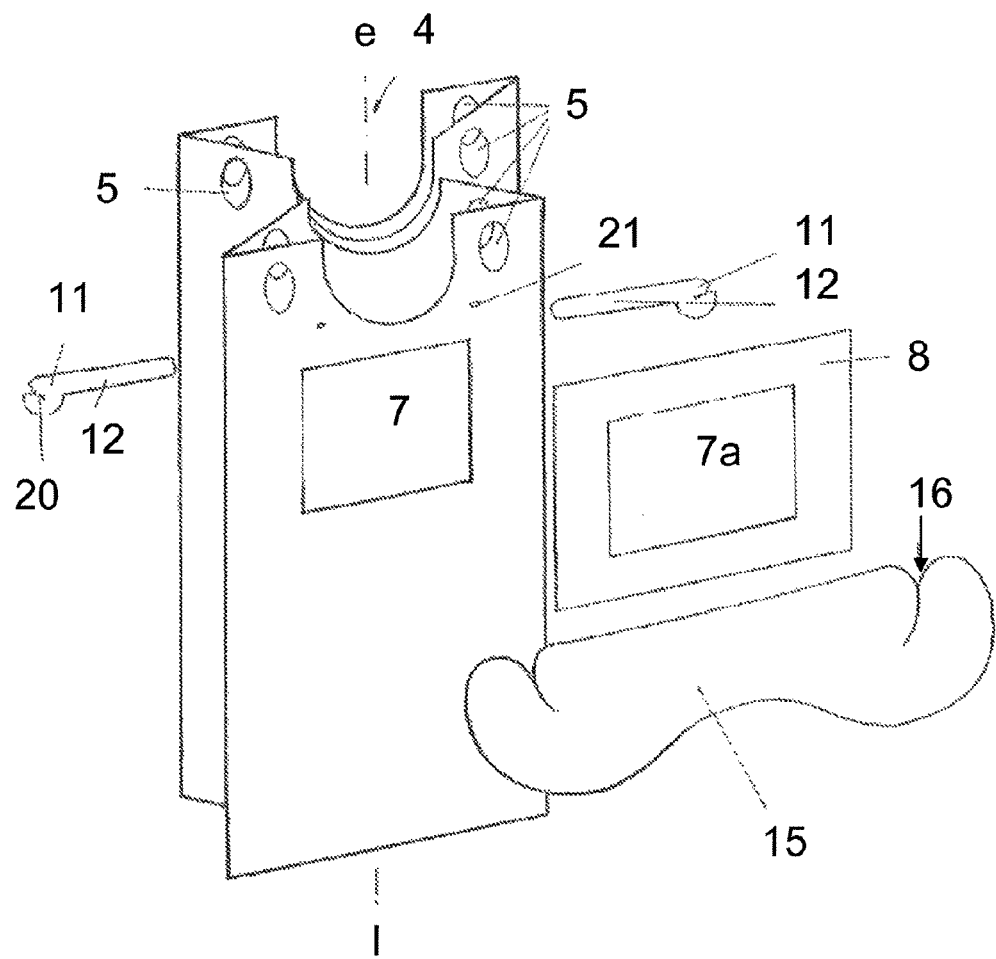
FIG. 1 is an exploded view of the components of a disposable excrement collection device according to one embodiment.

Referring now to the drawings, wherein like reference numerals refer to like parts throughout, there is seen in FIG. 1 an excrement collection device denoted generally by numeral 30. According to one embodiment, excrement collection device 30 comprises the following: collecting bag B; lateral folds 1 and 2; bag upper angle 3; bag semi-circular cut space 4; a series of holes or other securing means denoted by numeral 5; an upper thermo-sealed space 6; a bag quadrangular opening 7; a supplementary layer of laminar material 8; a sheath 9 surrounding opening 7; closing filament 10; pins external ends 11; lock pins 12; the upper part 13 of the front face of bag B; low transversal part 14 of the front face of bag B; a long, laminar, transversal, rigid piece 15; piece fixing notches (throats) 16; elastic filaments 17 and 18; end laces 19 of the elastic filaments; slots 20 on the top of pin 12; and elastic filaments exit holes 21.

Figure 2:
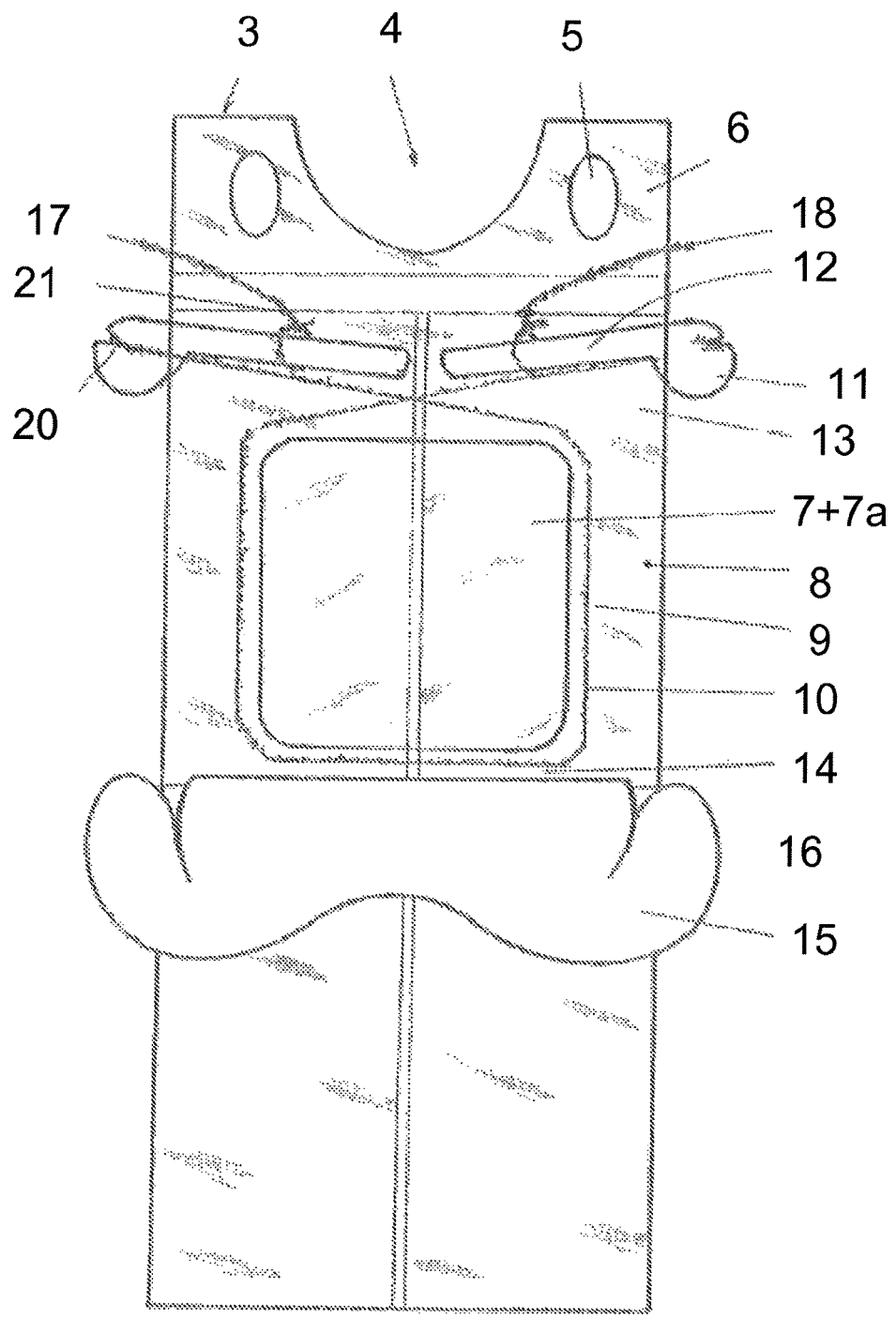
FIG. 2 is a planar view of the disposable excrement collection device presented from the plane in which the opening of the bag is placed.
Figure 3:
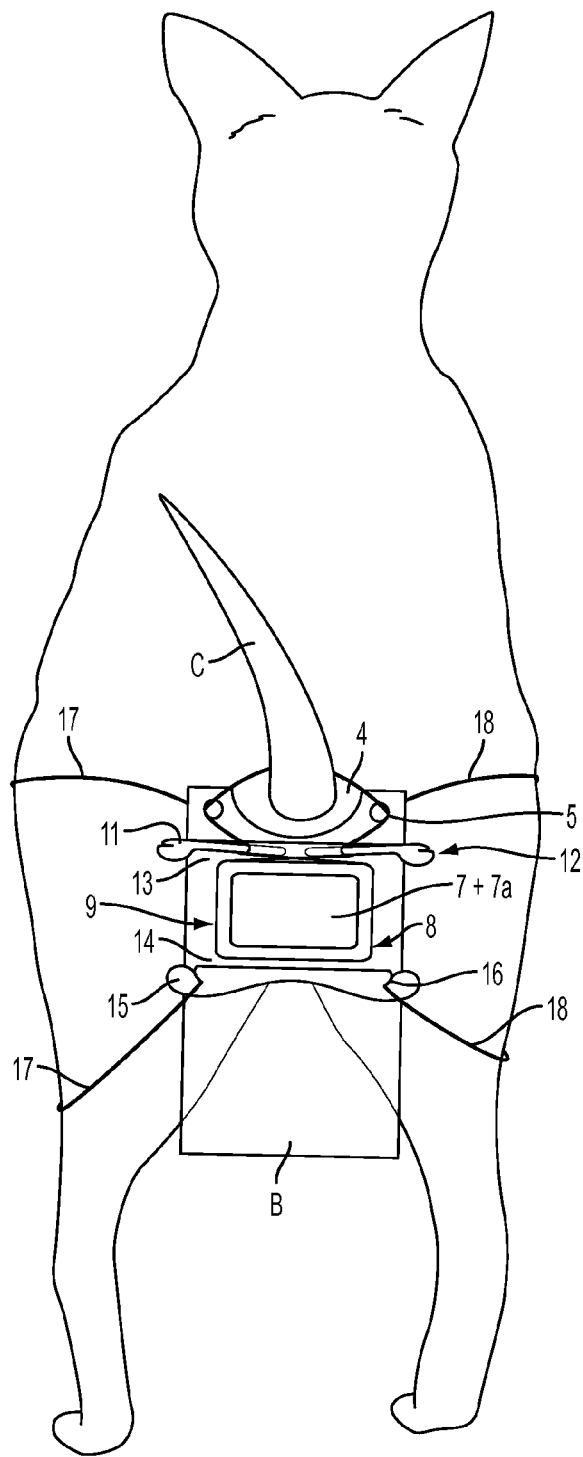
FIG. 3 is a perspective view of a dog, pictured from its tail and with the device properly located.

FIG. 1 is an exploded view of the components of excrement collection device 30 according to one embodiment. In this preferred embodiment, Bag B is longitudinally folded by opposite sides 1 and 2 to the axis of symmetry e. The edge of the sealed upper end 3 of the bag has a cut-out 4 in the form of a circular arc which is flanked by a pair of holes or other attachment or securing means 5 that extends over all folds. This upper space 6 is thermo-sealed and joins the four layers that form it. At a relatively short distance from the thermo-seal a quadrangular space 7 is cut which preferably only extends to the frontal layer and that defines the lateral opening of the bag and on which a fifth layer 8—supplementary to the bag's material—is adhered, and which has a free quadrangular space 7a approximately equal and coinciding to quadrangular space 7, and which forms a sheath 9 around both quadrangular overlaid openings 7 and 7a in which there is a filament 10. Sheath 9 could alternatively be a hem formed around the edge of opening 7 and/or 7a. Filament 10 has ends which are crossed over the quadrangular opening (as shown in FIG. 2) and which are tied to external end 11 of a pair of lock pins 12 collocated on the upper part 13 of the front face of bag B. In one embodiment, the lock pins are inserted at least partially into sheath 9 formed between the front face of bag B and laminar layer 8. Next to lower transversal part 14 of the front face of bag B is a long transversal laminar piece of rigid material, denoted by numeral 15, provided with fixation notches 16 on its opposed endings adopting a "throat" form. Rigid material 15 is preferably arch-shaped and forms both slots which are strengthened and end in simple cuts. The ends of elastic filaments 17 and 18 are hooked into one of notch 16 (as shown in FIG. 3). In turn, the opposite ends of elastic filaments 17 and 18 pass through holes 21 of transversal upper part 13 and hook into one of the retaining slots 20 formed in the end of one of lock pins 12. Elastic filaments 17 and 18 thereby form a loop around the animal to hold excrement collection device 30 in place, either by looping around each leg, or by looping around the animal such that device 30 is held firmly in place, including during movement by the animal.

In one embodiment, filament 10 is located in a space formed between the front surface of bag B and supplementary laminar layer 8. In other words, layer 8 is attached, connected, or adhered to bag B in such a way that it creates a central space in which filament 10 can reside. For example, the very outer edge of layer 8 and the inner edge—defined by opening 7a—can be the attachment points, thereby leaving a central unattached space in which filament 10 can reside and freely move. This method of attachment allows the user to cause opening 7 and 7a to close when the user pulls the two ends of filament 10. Sheath 9 and filament 10 together with bag B therefore function similar to a drawstring pouch. When the ends of filament 10—the drawstring—are pulled by retracting lock pins 12, the filament pulls the edges of openings 7 and 7a together.

To facilitate understanding of the excrement collection device 30, a description of the functional and operative relationship of its parts and of the results they produce is hereby provided.

As shown in FIG. 3, excrement collection device 30 is placed on an animal's tail with bag B's mouth—7 and 7a—facing the animal's anus such that animal's tail c coincides with semicircular space 4 of the device. That is, semicircular space 4 of the device prevents the animal's tail from interfering with the device.

Elastic filaments 17 and 18 are passed through holes 5 to surround the animal's tail c and then around the animal's thighs, ultimately returning to the device to hook into the slots 16 of laminar element 15, thereby holding the device in place on the animal. In a preferred embodiment, elastic filaments 17 and 18 are kept tense so as to maintain the device in the correct position. With the device in place, excrement will enter bag B through bag B's mouth—7 and 7a—which are facing and aligned with the animal's anus.

Once the bag has collected excrement or is full, the bag must be removed for disposal. To do that the pins 12—each of which hold one end of either elastic filament 17 or elastic filament 18—must be retracted. By doing this, the filaments are unhooked of their respective pins and they are loosened around animal's legs. At the same time and as pins 12 are retracted, the ends of filament 10 contained in sheath 9 are pulled away from each other, thereby pulling the sides of opening 7 (which are connected to filament 10 as shown in FIG. 2) closer together. This results in closing of quadrangular opening 7, keeping the content of bag B perfectly isolated.

Accordingly, with a single movement of the pins, elastic filaments 17 and 18 are simultaneously unhooked, the collecting bag is perfectly sealed via filament 10, and the collecting bag B is separated from device 30 and ready to be disposed of. All of this can be achieved with just one movement.

Notably, long laminar piece 15, transversally fixed to a substantially rigid bag, can be made of cardboard or any other similar material.

In just one example of a constructive variation, hole 5 may be replaced by a laminar piece substantially rigid placed transversally over the opening 7 and 7a of the bag having lower concavities opposed in their ends which serve for elastic filaments passage into the links on the animal's tail, in which case holes 5 may be eliminated.

Yet another example of a constructive possibility is to eliminate the laminar piece 15 necessary to provide a hook for the ends of elastic filaments 17 and 18, consisting of both notches on their opposed ends adopting both throats 16 shapes (preferably arched), and defining both slots which are narrowed and end in simple cuts. The means of fixation of elastic filaments may be chosen among, for example, lock knots in the above mentioned slots, anchor hooks, an auto-adhesive tape, a hook-and-loop system (Velcro) and any other similar method which may be placed where the long laminar piece 1" is represented in the positions filled by hook notches 16.

As discussed above, it is shown herein that with a single movement closing and releasing of the bag can be attained, thereby eliminating the possibility of getting dirty or polluting the environment. The bag remains perfectly sealed ready to be disposed of in a proper way.

Accordingly, per a preferred embodiment the device comprises a collection bag with side panels folded toward an axis of symmetry. The top of the sealed upper end of the bag has a cut-out in the form of a circular arc and two holes or securing means. The bag has a lateral opening and an additional layer of the same material with a corresponding opening is adhesively bonded thereon, thereby forming a sheath or conduit that completely surrounds the opening. This sheath contains a thread or filament, the ends of which cross over the opening and are joined to the emerging ends of a pair of removable pins positioned on or in the sheath. A rigid component is adhesively bonded horizontally below the opening, the sheath having securing notches at the ends into which the free ends of two elastic threads operationally engage, whilst the respective opposite ends of the elastic threads are secured to each of the removable pins.

Although the present invention has been described in connection with a preferred embodiment, it should be understood that modifications, alterations, and additions can be made to the invention without departing from the scope of the invention as defined by the claims.

What is claimed is:

1. An animal excrement collection device, said device comprising:
    an excrement collection bag comprising a front panel, said front panel defining a first opening;
    a sheath formed on said front panel and located proximate to a perimeter of said first opening;
    a first lock pin removeably attached to said excrement collection bag;
    a second lock pin removeably attached to said excrement collection bag;
    a sheath filament disposed within said sheath, said sheath filament comprising a first end connected to said first lock pin and a second end connected to said second lock pin;
    a first string comprising a first end removeably connected to said first lock pin and a second end in communication with said front panel; and
    a second string comprising a first end removeably connected to said second lock pin and a second end in communication with said front panel;
    wherein a user substantially closes said opening and disengages said excrement collection device from said animal by pulling said first and second lock pins in a direction away from said excrement collection bag.

2. The animal excrement collection device of claim 1, wherein said excrement collection bag comprises a non-permeable material.

3. The animal excrement collection device of claim 1, wherein said excrement collection bag is opaque.

4. The animal excrement collection device of claim 1, further comprising:
    a layer of material attached to said front panel and located around said perimeter of said first opening; and
    a second opening defined in said layer of material, wherein said first opening and said second opening substantially align when said layer of material is attached to said front panel;
    wherein said layer of material defines said sheath when said layer of material is attached to said front panel.

5. The animal excrement collection device of claim 4, wherein said first and second openings align with the anus of said animal when said excrement collection device is affixed to said animal.

6. The animal excrement collection device of claim 1, further comprising an attachment component in communication with said front panel, wherein said second end of said first string and said second end of said second string are attached to said attachment component.

7. The animal excrement collection device of claim 6, wherein said attachment component comprises a rigid material.

8. The animal excrement collection device of claim 7, wherein said attachment component comprises cardboard.

9. The animal excrement collection device of claim 6, wherein said attachment component further comprises a first notch engaging said second end of said first string, and a second notch engaging said second end of said second string.

10. The animal excrement collection device of claim 1, wherein said bag further comprises an arch defined in an upper region of said bag, said arch creating a space for a tail of said animal when said excrement collection device is attached to said animal.

11. The animal excrement collection device of claim 1, wherein said second end of said first string and said second end of said second string are attached to said attachment component by a first means, said first means selected from the group consisting of an anchor hook, adhesive, hook-and-loop, and a combination thereof.

12. The animal excrement collection device of claim 1, wherein said front panel of said bag defines a first and second hole in an upper region of said bag, said first string passing through said first hole and said second string passing through said second hole.

13. The animal excrement collection device of claim 1, wherein said first end of said first string and said first end of said second string disengage from said first and second lock pin, respectively, when said first and second lock pins are pulled in a direction away from said excrement collection bag.

14. The animal excrement collection device of claim 1, wherein a user pulls said first and second lock pins in a direction away from said excrement collection bag when excrement is deposited by said animal in said bag.

15. The animal excrement collection device of claim 1, wherein said bag further comprises:
    a first side panel; and
    a second side panel.

16. The animal excrement collection device of claim 15, wherein said first side panel is folded inward toward the interior of said bag and said second side panel is folded inward toward the interior of said bag prior to excrement being deposited into said bag.

* * * * *